United States Patent [19]
Greenwood et al.

[11] Patent Number: 5,854,447
[45] Date of Patent: Dec. 29, 1998

[54] ELECTRONIC FISH LENGTH MEASURING APPARATUS

[76] Inventors: Jon B. Greenwood, 8579 Gray Ct., Arvada, Colo. 80003; Bruce H. Campbell, 567 Manorwood La., Louisville, Colo. 80027

[21] Appl. No.: 20,589

[22] Filed: Feb. 3, 1998

Related U.S. Application Data

[63] Continuation-in-part of Ser. No. 781,529, Jan. 9, 1997, abandoned.

[51] Int. Cl.[6] ............ G01G 19/40; G01G 19/56; G01G 19/00
[52] U.S. Cl. ............ 177/25.14; 177/148; 177/245
[58] Field of Search ............ 177/25.11, 25.12, 177/25.13, 25.14, 148, 149, 126, 245

[56] References Cited

U.S. PATENT DOCUMENTS

| | | | |
|---|---|---|---|
| 2,708,368 | 5/1955 | Kolisch | 177/25.11 |
| 4,660,666 | 4/1987 | Reder et al. | 177/148 |
| 4,718,507 | 1/1988 | Howlet et al. | 177/210 FP |
| 4,765,420 | 8/1988 | Mengo | 177/149 |
| 4,785,897 | 11/1988 | Keinert, Jr. | 177/148 |
| 4,839,675 | 6/1989 | Owen | 177/245 |
| 4,840,239 | 6/1989 | Slagg | 177/25.14 |
| 4,936,399 | 6/1990 | Christman et al. | 177/210 C |

*Primary Examiner*—Randy W. Gibson
*Attorney, Agent, or Firm*—Thomas J Loran

[57] ABSTRACT

An apparatus and method that electronically measure and display the size of a fish in a net or on any fish support using an electrical transducer generating a signal responding to the weight of a fish, and electronics converting and displaying the signal to indicate fish weight, length, and/or girth to inform a person of fish size.

14 Claims, 6 Drawing Sheets

ELECTRONIC FISH LENGTH MEASURING APPARATUS

This patent application is a continuation-in-part of application Ser. No. 08/781,529 filed Jan. 9, 1997 that is abandoned, the contents of which are hereby incorporated by reference.

BACKGROUND OF THE INVENTION

1. Field of the Invention

This invention relates to electronically indicating the length of a fish from the weight of a fish using an electrical transducer responsive to weight of a fish and electronics to convert fish weight signal into a display of weight, length and/or girth. In this continuation-in-part, a fish is placed on any support while determining the fish size. The new embodiments are described near the end of the summary and near the end of the description of the embodiments.

2. Description of the Prior Art

Scales for weighing fish have been commonly used incorporating both mechanical and electronic methods. The mechanical methods have used springs and levers, either portable or incorporated into fishing nets. U.S. Pat. Nos. 2,129,469; 2,633,351; 3,082,561; 3,803,742; 4,765,420; and 4,785,897 have mechanical weighing devices attached to fish nets. U.S. Pat. Nos. 3,077,237 and 4,631,851 use mechanical weight and length measuring devices attached to fish nets involving manipulation of the fish or net. Portable electronic scales using capacitance, springs attached to a variable resistor, and strain gages are described respectively in U.S. Pat. Nos. 4,718,507; 4,936,399; 5,031,710; and 4,660,666. The U.S. Pat. No. 4,660,666 patent references prior art of scales using strain gages. The U.S. Pat. No. 4,660,666 strain gauges are mounted inside a "weatherproof" container where in the present invention the strain gauges are mounted exterior of the container on a net providing more accurate readings by not passing through seals and thereby allowing hermetically sealed containers for the remaining electronics.

Many United States' state and federal fishing regulations and Canadian fishing laws place a restriction on fish size related to length so the anglers must be aware of the length to decide if the fish can be legally retained. It is difficult to measure two parameters such as weight and length simultaneously with any single mechanical apparatus. Furthermore, it is difficult to design a suitable mechanical apparatus that can convert a measured fish parameter such as weight to a desired displayed parameter such as length where the conversion is complex or non-linear, and allow for the selective adjustment of conversion parameters for different fish body types, condition factors, or species. No electronic fish measuring device uses an electric signal produced by the weight of a fish to be electronically converted into a length display.

Mechanical measuring devices attached to nets may generate noise because they contain moving parts such as levers and springs. Audible noise may frighten fish that is undesirable in many fishing situations where a hand-held landing net may be used.

All the prior art electronic apparatus patents describe remote devices that require appreciable time for the fish to be handled and measured while out of the water. With these prior art devices the fish must be released from a hook, then handled out of the water, and placed on another hook or similar device for electronic weighing, and then handled again to determine the length of the fish. This process generally requires two hands. This delay and trauma while handling the fish reduces the chance for fish survival if the fish must legally be released in the wild or if it is desired to be release the fish alive for science or fish farming.

None of the prior art patents addresses protection of the fish from handling injury or expresses the objective of allowing rapid measurement of fish size parameters with the intent of releasing the fish alive with minimum handling and trauma as is one of the objectives of the present invention.

None of the prior art patents describes a hand-held fish net with a built-in electronic scale for measuring and displaying fish weight.

None of the prior art patents describes a method and/or apparatus which electronically measures the weight of a fish in a net or other support and then converts the measured weight into a display of selected fish size parameters such as weight, length, and/or girth.

SUMMARY OF THE INVENTION

The present invention comprises an automated electronic fish measuring apparatus and method for determining fish size produced by the weight of a fish contained in a net and visually displays selected fish size such as weight, length, and/or girth. The fish weight is converted into an electric signal using a weight transducer such as a strain gauge or any or a number of electronic weight transducers recognized by those skilled in the art. The weight signal is input to a signal conversion electronic circuit that converts the weight signal to signals representative of fish size. The fish size signals are processed or converted to generate display output signals.

The display output signals generate a visual display of fish parameters such as weight, length, and girth in appropriate measurement units such as ounces, pounds, grams, or kilograms, and inches or centimeters on a suitable analog or digital display device. A single display device may be used to display multiple fish size parameters sequentially or continuously alternating. Multiple displays may be used for simultaneous display of multiple fish size parameters. The present invention may allow rapid determination of fish size using one hand, without removing the fish from the net, resulting in minimal trauma to the fish or placing a fish on a means for weighing a fish.

The electronic signal conversion apparatus may be enclosed in a sealed housing attached to the net that preferably serves as the net handle. The electronic circuit includes a power supply, a weight transducer for generating an electric signal related to the weight of the fish such as a load cell incorporating one or more strain gauges, the above mentioned signal conversion electronics converting the weight signal into the display output signals that produce the weight, length, and/or girth signals, that in turn generate the desired displayed parameters including weight, length, girth, or other calculated size characteristic of the entire fish organism. The electronic apparatus may also contain additional components that allow the automatic taring the previously wetted net prior to weighing the fish and components for compensating the weight transducer, signal conversion electronics, or display devices for temperature influences.

Initial activation of the apparatus automatically tares the weight of a previously wetted net and indicates readiness for fish size measurement by displaying zero fish weight, and/or length, and/or girth. After a brief delay while the fish is positioned into a net and raised from the water, the desired fish weight, length, or girth is displayed simultaneously, alternately, or individually on the display or displays. The size parameters are converted from weight by previously established mathematical relationships. Optional apparatus additions such as storing the information for each fish, displaying of legal limits, a light or back-lighted display for night fishing, and selection of weight to fish size conversion parameters related to different types or species of fish may be incorporated.

Another embodiment of the invention is to add the method and apparatus of determining the fish length or girth from any electronically determined fish weight signal produced from a fish weighed by any means for supporting a fish. Another new embodiment uses the electronic signal produced from the weight of a fish and adds electronic components to display the length of a fish.

Accordingly, an object of the invention is to determine a fish size with minimal injury to the fish by briefly having the fish out of the water during the determination of legal limits in sport or commercial fishing or monitoring fish growth in fish farms.

Another object of the invention is to have an electronic method of displaying selected fish size characteristics such as length, girth, and/or weight converted from fish weight.

Another object of the invention is using only one hand to measure a fish size while the other hand is free to hold a fishing rod, record data, or perform any other desired manual function without having to move from the location where the fish is captured in the net.

Another object of the invention is to provide accurate automatic ambient temperature compensation of the measuring electronics to compensate for any temperature effects on the sensing devices or signal conversion circuitry.

Another object of the invention is to provide electronic means for measuring fish size that is silent when compared to mechanical methods.

Another object of the invention is to have a hermetically sealed apparatus that can be completely immersed under water.

DETAILED DESCRIPTION OF THE PREFERRED AND OTHER EMBODIMENTS

Figure 1:
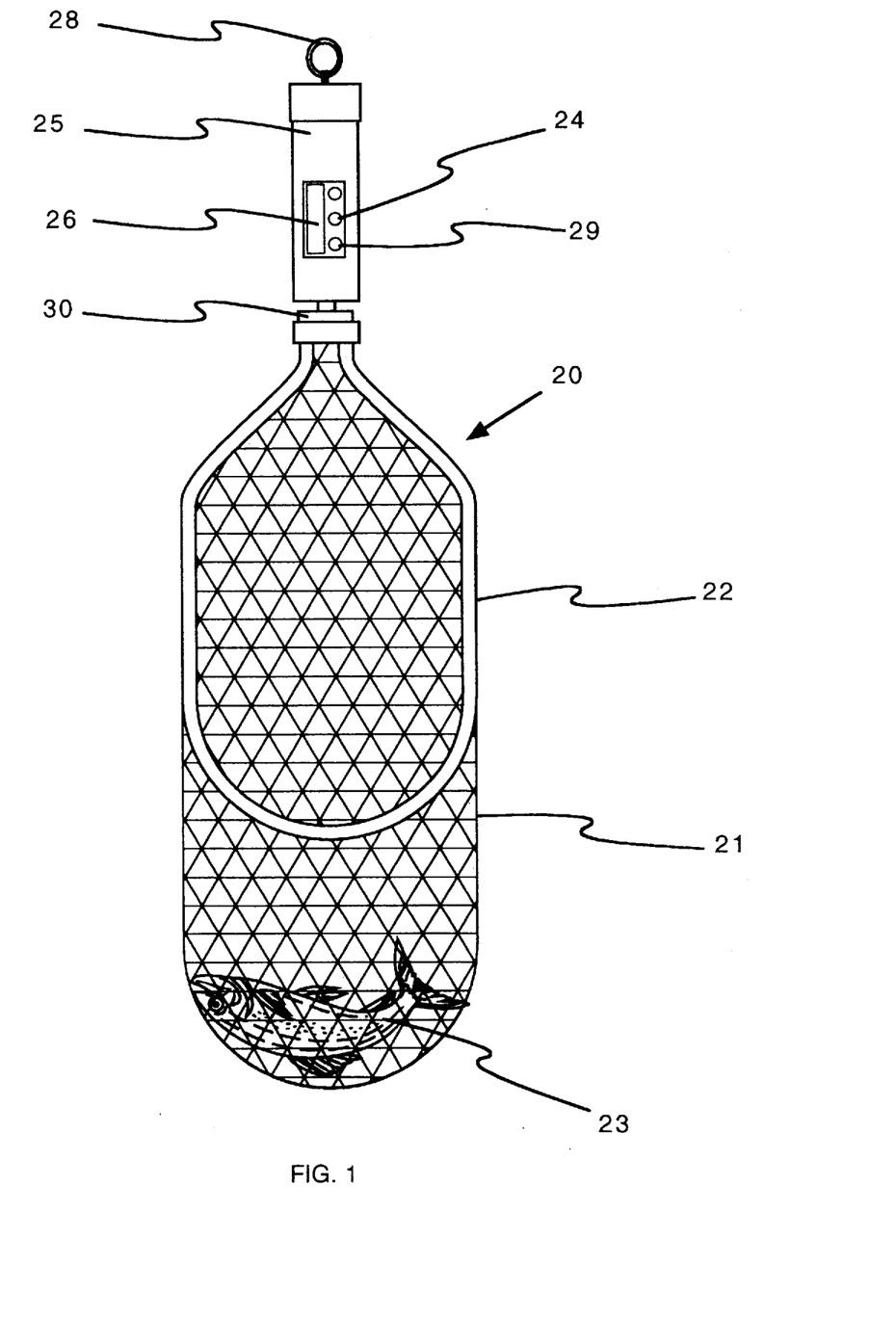
FIG. 1 shows a perspective pictorial drawing of the apparatus to measure and display the weight, and/or length, and/or girth of fish using a net.

FIG. 1 is the frontal view of one possible design of the present invention apparatus 20. Included in the apparatus is a means 21 for containing a fish and a fish 23. Supporting this means for containing a fish may be a full or partial hoop 22 or any rigid member curved or straight. Hoop 22 may be eliminated for some embodiments of the invention. Also included in apparatus 20 is a means 30 for generating an electric signal responding to the weight of a fish or the means for containing a fish, that attaches to means 21 for containing a fish or to the hoop if a hoop is used. The apparatus has a housing 25 that adjoins the means 30 for generating an electric signal. The housing is preferably hermetically sealed, encompassing all or some of the electronic components. Display 26 indicates fish size.

The means 21 for containing the fish may be formed into any shape that separates water from a contained fish. This means 21 could be a surface member having openings or constructed from pieces of plastic, metal, wood, or fabric that preferably form a net or other fish retaining surface to contain fish 23 while displaying fish size. In FIG. 1 the electronic components of the invention are inside a housing 25, preferably hermetically sealed, shown to be part of a fish net handle. The housing may also be attached to the net and not be part of any handle. The housing may be any shape to enclose electronic components, constructed from metal, wood, composite, or plastic, and have a removable access section (not shown) of any shape that seals during use. A water proof activation switch 24 and visual display 26 are preferably positioned for one hand operation. The visual display 26 could be an LED (light emitting diode), LCD (liquid crystal display), analog dial gauge, or any other type of digital or analog display recognized as suitable to display fish size by those skilled in the art. The display shows appropriate measurement units such as ounces, pounds, grams, or kilograms, and inches or centimeters on a suitable analog or digital display device.

Visual display 26 may indicate individual or any grouping of size parameters including fish weight, length, girth, or other desired parameter related to fish weight in preset metric or English units or units selected by choice using a selection switch 29. This selection may be preprogrammed into the apparatus 20. The display may be simultaneous, alternating, or selected by choice. The display may be a single display or a plurality of displays. An optional finger ring 28 is positioned on the end of the handle as a means to secure the apparatus to a person and assist aligning the weight of the fish with the means 30 for generating a signal.

The weight of the fish is transferred to the means 21 for containing a fish, to the partial or full hoop if a hoop is used, and into a means 30 for generating a signal from the weight of a fish. The signal from this means then proceeds into a sealed housing 25. This signal transfer is accomplished through mountings and electrical connections as shown in FIG. 2 and FIG. 3.

Figure 2:
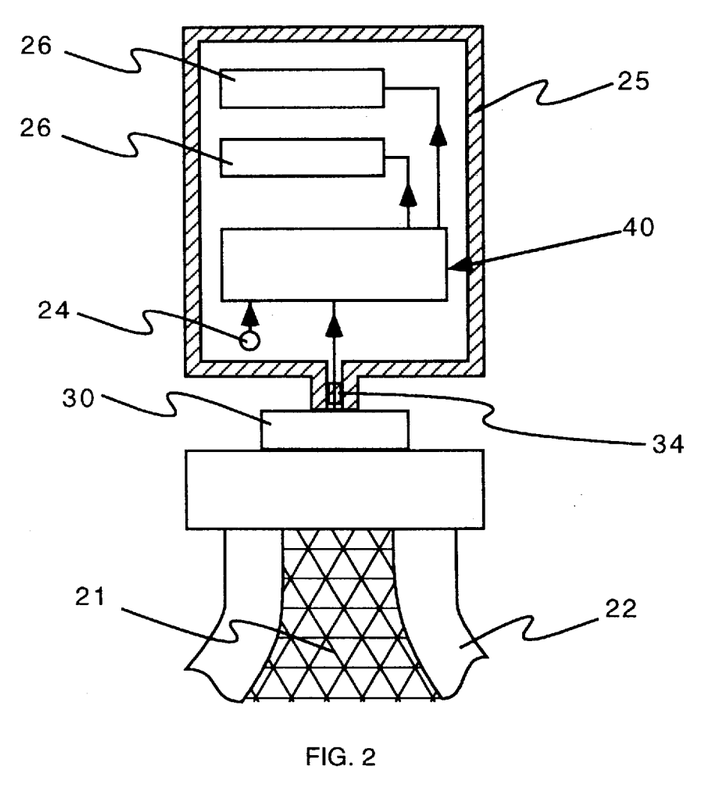
FIG. 2 shows a functional block diagram of the components used in the apparatus.

FIG. 2 shows the means 30 for generating a signal from the weight of a fish mounted exterior of sealed housing 25. Exposure to water may not affect some types of means 30 such as strain gauges when properly installed. A fish weight inside the means 21 for containing a fish generates a signal by means 30. The means 30 for generating a signal from the weight of a fish include spring loaded potentiometers, variable capacitance sensors, strain gauges, piezo crystals, digital signal producers, or load cells measuring pressures, strains or forces caused by fish weight and all these devices use circuitry known in the art. These sensing devices may be mounted exterior of the sealed housing 25 with signals passing through a hermetic seal 34. The exterior positioned means 30 are rigidly mounted on the means for containing the fish 21 or the hoop 22. Hermetic seal 34 excludes all moisture from the electronics and permits submersion under water. For example, mounting strain gauges outside the sealed housing and sealing the electrical connections achieves a hermetic seal. Mounting the means 30 exterior of the housing 25 eliminates friction through seals or signal distortion from seals that transmit forces initiated from the weight of a fish.

The signal from means 30 is sent to a means 40 for converting and displaying the signal into a display located inside the housing 25. A waterproof selecting switch 24 initiates the electronics and display 26 located in the housing. The signal from means 30 may be electric, electronic, or digital. The signal from this means then proceeds into a sealed housing 25.

Figure 3:
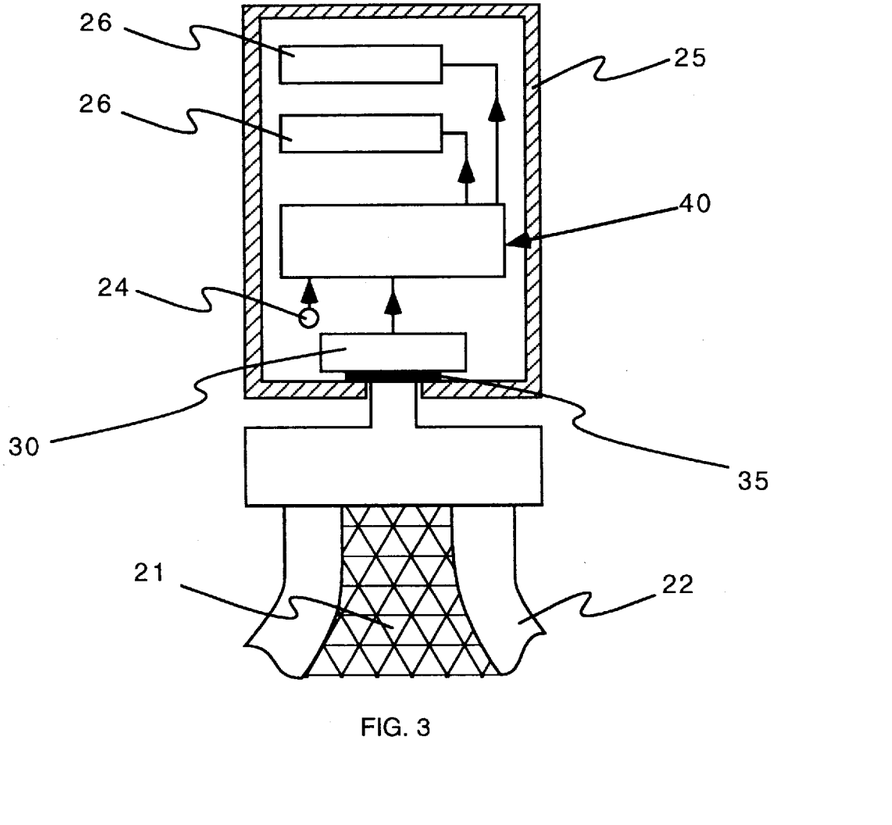
FIG. 3 shows another embodiment of positioning the components in the apparatus.

FIG. 3 shows another embodiment of the invention where the same means 30 for generating a signal from the weight of a fish described above is located inside the housing 25. In this embodiment, a flexible seal or a seal 35 allowing transfer of force must be used to transmit fish weight forces, such as pressures or strain through a seal to the means 30. The figure shows a disk, sealed on the periphery. The hoop 22 transmits the weight of a fish to the disk center where the means 30 senses the signal inside the sealed volume. The means 30 for generating a signal is bonded to the seal that transmits the weight of a fish in the means for containing a fish. Materials such as non-flexible plastics or metals including the disk in the figure may act as seals. Moveable shafts, from the hoop to the means for generating a signal, having elastomer seals such as O-rings or V-rings may also be used. Other elastomer shapes may also be used to produce a seal for movement or transmitting weight forces.

Figure 4:
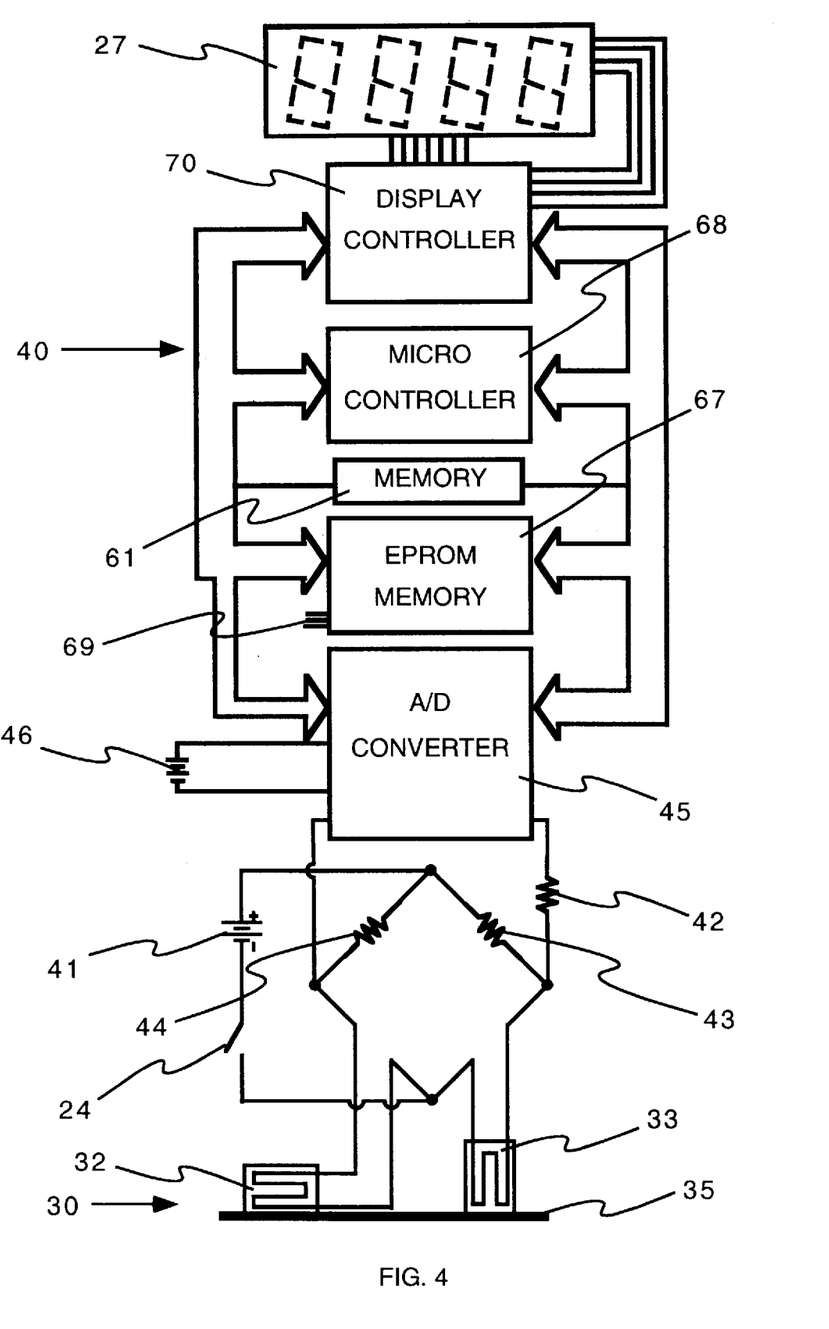
FIG. 4 shows a diagram indicating the electronic components in the present invention.
Figure 5:
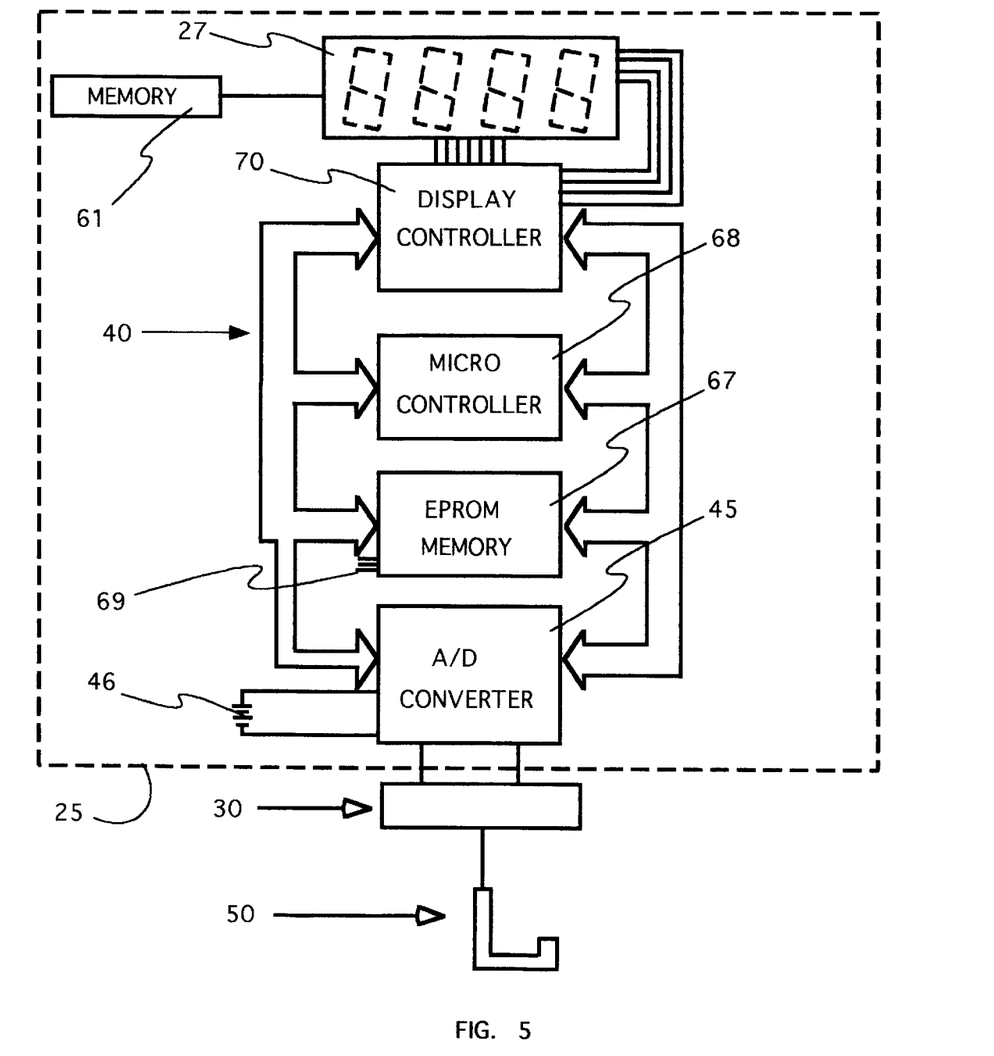
FIG. 5 shows a diagram indicating the electronic and other components to weigh and display fish length and weight using a means other than a net for supporting a fish.
Figure 6:
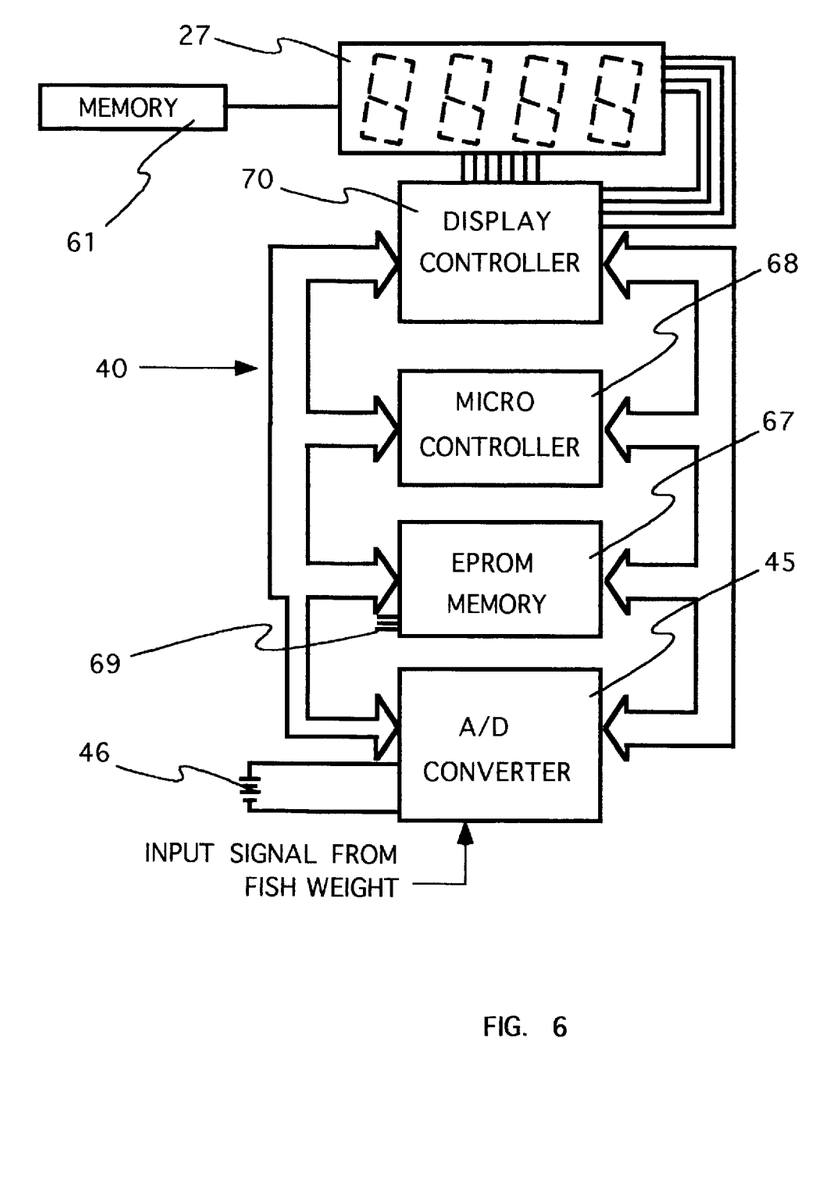
FIG. 6 shows a diagram indicating electronic components to display fish length using electronic signals produced from fish weight by other apparatus.

FIGS. 4, 5, and 6 show block diagrams of one means 40 for converting and displaying a signal from the weight of a fish into a display of fish size. A strain gauge 32 is shown as one of the means 30 for generating a signal from the weight of a fish. A second strain gauge 33 adjusts the signal for the ambient temperature resulting in more accurate weights whether used in warm or cold conditions. Use of temperature compensating devices for relatively constant ambient temperatures may be omitted. Means 30 other than strain gauges may not need this parameter or may have it as an integral part. Temperature compensation ensures fish size measurement accuracy over the expected climatic and water temperature (i.e. ice/tropical/cold water/seasonal fishing conditions). The strain gauges in means 30 for generating a signal may be a plurality in any embodiment for more sensitivity and are shown located inside the sealed housing 25 on a disk 35 that is sealed on the periphery. Also inside the sealed housing is the means 40 for converting and displaying a signal from means 30 into a fish size display.

A battery 41 provides the electrical energy to produce an electric signal related to the weight of fish and other power needs for the apparatus. Another battery 46 may also power other electronic means 40 for converting and displaying fish size if necessary. This embodiment contains an electric Wheatstone Bridge circuit that is well known in the art including resistors 43 and 44, and a variable resistor 32, that is a strain gauge or gauges, where the resistance amount relates to weight of the fish. Resistor 42 may be in some circuits that is an analog/digital converter or impedance from an indicator. Other appropriate or known circuits to produce an analog or a digital signal from fish weight may also be used with the various types of the means 30 for generating a signal from the weight of a fish.

A switch 24 initiates a voltage from a battery 41 producing a signal from a wet net or fish in a net. An analog weight signal is changed to digital by a converter 45 shown as a component of a electric and electronic components means 40 for converting and displaying fish weight, length, and/or girth. An analog or digital signal of the fish weight from means 30 may also be processed to directly indicate fish weight and length in the displays eliminating this signal converting component. An auxiliary battery 46 may be used to supply reference voltage to the electronic components.

Other components of the electric and electronic means 40 for converting and displaying fish size include an Erasable Programmable Read Only Memory (EPROM) and memory 67, a microcontroller 68, a display controller 70, and a display 26. The "data bus" is shown on the right and "address bus" on the left. Signals in a bus may move in any direction. The installation and use of these components are known in the art of electronics. The EPROM has a digital input port 69 for programming the weight to fish size conversion factors into a memory and other inputs using selection switches 29. The other inputs include size measurement units, legal limits, backlighting, storing information, or other information. The microcontroller 68 and the display controller 70 direct signals. More than one component in the electric and electronic components means 40 for converting and displaying fish size may be combined with another or other components into one component. The EPROM may have a preset memory for one or more types of fish and may not be erasable. The fish types programmed into the memory may be selected on option for display. Also other electronic components to convert fish weight to display fish length may be substituted to achieve the same display of length results. An option would be to send the signal from the A/D converter directly to the display. Another option would store a fish identity number, weight, and length in a memory function 61 for later recall or transfer to a computer. This function may be integrated into the EPROM. If only analog signals are desired in the apparatus, the A/D converter may be eliminated or positioned in other locations.

The means 40 for converting and displaying a signal from the weight of a fish into a display may be specially designed as described above for a variety of fish species but also designed for a single fish type. Fish size includes weight, length, girth, and any other physical parameter that relates to the weight of a fish, singly or in any combination of these size parameters.

The method of determining the size parameters of a fish based on the fish weight includes; first, a microprocessor zeros the digital signal by removing the wet weight of the means 21 for containing the fish such as a net. This can be accomplished before the fish is in the net, while in a net but not supported by the net, or from a predetermined weight stored in memory. After the fish is supported in the net, the digital or analog weight of the fish may be displayed solely on the display 26 or elected to be displayed later. An EPROM memory and a microcontroller convert the weight signal to a length signal for display by using a preprogrammed relationship to indicate the length of the fish on the display 26. In similar manner, the girth or any other parameter relating to fish weight is displayed. The display controller determines the value to be shown on the display 26. For example, the length may be solely displayed, in addition to the weight display, combined with the weight display, or alternate with the weight display. The above described apparatus and method determine the size of a fish with minimal trauma to a fish. Although the preferred use is for one hand, the apparatus and method may be used with two hands or supported by other means such as poles, cables, or other devices that support the means 21 for containing one or more fish.

In the present invention an electronic means for converting and displaying the weight of fish to display the desired size parameter of the fish is used. Various formulas may be used in the invention and the following are samples, although other formulas that are based on fish weight to determine fish size properties or parameters are considered to be included in the present invention.

The converting is accomplished by a EPROM and a microcontroller using the fish weight to fish size conversion. The most common form of the length-weight relationship for fish is a non-linear formula:

$$W = A \cdot L^B$$

where W=weight, A and B are constants determined experimentally and L=length. Other fish relationships have been described in the article "Efficiency and bias of estimators and sampling designs for determining length-weight relationships of fish" Hayes, Brodziak, and O'Gorman, Published in the Canadian Journal Fish & Aquatic Science: 52: 84–92 (1995)

The formulas or equations are determined by sampling a large number of fish and measuring parameters. The relation between parameters are then fitted to appropriate equations, samples are listed below although other equations may also be used in the invention.

EXAMPLE 1

The mean weight W(kilograms) at length L(centimeters) for haddock is determined from the following equation:

$W = 6.59 \times 10^{-6} L^{3.120}$ Or rearranging the formula:

$$L = \left[ \frac{W}{6.59 \times 10^{-6}} \right]^{\frac{1}{3.120}}$$

EXAMPLE 2

The following equation and Table 1 indicate conditioning factor constants determined by the U.S. Department of Interior, Fish and Wildlife Service to relate the weight of fish to fish length by equation:

$$L = \left[ \frac{W}{C \times 10^{-7}} \right]^{\frac{1}{3}}$$

C=Conditioning Factor; L=Length (in.) ; W=Weight (lb.)

TABLE 1

| Condition Factors (C) | Fish Type | Condition Factors (C) | Fish Type |
|---|---|---|---|
| 1,500 | Muskellunge | 2,000 | Northern pike |
| 2,500 | Lake trout | 3,000 | Chinook salmon, |
| 3,000 | Walleye, channel catfish | 3,500 | Cutthroat trout |
| 3,500 | Coho salmon, steelhead | 4,000 | Rainbow, brook, brown trout |
| 4,500 | Largemouth bass | | |

EXAMPLE 3

The Girth of a fish is determined from the weight of the fish where W=fish weight (lbs.) and G=fish girth (in.) using the following equations:

Trout $\quad$ Bass $$G = \frac{(1500\ W)^{1/2}}{L} \quad G = \frac{(800\ W)^{1/2}}{L}$$

Naturally, the weight of fish relative to fish size may vary depending upon the fish and fish diet. For example, many fish in farms are specially fed to achieve the most economical growth. Therefore the constants in the equation may be adjusted in the EPROM to reflect the type of fish as found in nature or fish in special diets. The microprocessor may be preprogrammed or programmed in the housing for a special fish or fish size and may be adjustable for industrial, sport, or scientific purposes.

The embodiment of the present continuation-in-part, unlike the above referenced embodiments that have a means 21 for containing a fish that is a fish net, uses an apparatus having a means 50 for supporting a fish during weighing. This embodiment includes electronics to display fish weight and length with a hook to support a fish as shown in FIG. 5. This means 50 for supporting a fish during weighing also includes a hook, a surface member, a flexible fabric or plastic mesh or cloth, or any shaped protrusion that supports a fish. This means 50 is either flexibly or rigidly connected to the means 30 for generating a signal from the weight of a fish. The signal is either electrical or electronic and these terms are considered to be identical. This embodiment may be used in the present invention from a fish near the water or any location after catching a fish.

The embodiment allows weighing and determining the fish size such as weight, length and/or girth using any fish weight determining device or apparatus that produces an electric or electronic signal related to the fish weight as described above. The means 30 for generating a signal from the weight of a fish include but are not limited to U.S. Pat. Nos. 4,660,666; 4,718,507; 4,936,399; and 5,031,710. Respectively, these patents use electronics and a strain gauge, deflecting beam with coil that is part of an oscillator circuit, change of distance between two plates with a capacitance measuring device, and a spring with a variable resistor. The means 30 for generating a signal from the weight of a fish also includes devices such as spring loaded potentiometers, variable capacitance sensors, strain gauges, piezo crystals, digital signal producers, or load cells measuring pressures, strains or forces caused by fish weight and all these devices use circuitry known in the art.

FIG. 5 shows a block diagram of one means 40 for converting and displaying a signal from the weight of a fish into a display of fish size. Details and equations in this means for some fish are described above and other equations derived from the weight of a fish would also apply to these embodiments. The fish measurements of size or feature may include weight, length, girth, or other desired weight related physical feature or features such as shell size, claws or parts of shellfish. The display can be programmed to show any desired size feature or features measurement.

In this embodiment the electronic components or part of the components may be in a housing 25 that is either unsealed, hermetically sealed, weather proof, or not in a housing. The formulas may be altered to accommodate for special species of fish that are or will be grown to differ in sizes such as length or girth relating to fish weight.

Another new embodiment shown in FIG. 6 is adding the length determining device or apparatus to the above cited patents or other electronic devices using their respective electronic signals generated from a weight of a fish. These patents or other devices may have the means 30 for generating a signal from the weight of a fish and/or the means 50 for supporting a fish. The electric weight signal is converted as described above into displaying fish length or girth by the present invention. The electronic components to determine fish length or girth may be included in any weight electronic signal housing or added to electronic weight signal components by other housing designs.

From the above description of the invention, various changes and modifications to the apparatus will occur to those skilled in the art. All such modifications coming from within the scope of the original or amended claims are intended to be included therein.

We claim:

1. An electronic fish measuring apparatus comprising:
   (a) a means for generating an electronic signal from the weight of a fish,
   (b) a means for electronically converting said electronic signal into a visual display of fish length and,
   (c) a visual display of fish length and weight.

2. An electronic fish measuring apparatus as stated in claim 1 further comprising a means for supporting said fish connected to said means for generating an electronic signal from the weight of a fish.

3. An electronic fish measuring apparatus as stated in claim 1 wherein said electronic signal related to fish weight is generated by devices selected from the group consisting of spring loaded potentiometers, variable capacitance sensors, strain gauges, piezo crystals, digital signal producers, or load cells.

4. An electronic fish measuring apparatus as stated in claim 1 further comprising a means for electronically converting said electronic signal into a visual display of fish girth.

5. An apparatus for measuring and displaying the length of a fish comprising:
   (a) an electronic signal generated by the weight of said fish,
   (b) a means for electronically converting said electronic signal into a signal of fish length and,
   (c) a visual display of fish length.

6. A means for generating an electronic signal to display the length of a fish as stated in claim 5 further comprising a means for supporting said fish.

7. An electronic fish measuring apparatus as stated in claim 5 further comprising a means for electronically converting said electronic signal into a visual display of fish girth.

8. An electronic method for measuring and displaying the size of a fish comprising the steps:
   (a) initiating a means for generating an electronic signal from the weight of said fish,
   (b) using a means for electronically converting said electronic signal into a visual display of fish length and,
   (c) displaying said fish length.

9. An electronic method for measuring and displaying the size of a fish as stated in claim 8 further comprising a means for electronically converting said electronic signal into a visual display of fish girth.

10. An electronic method for measuring and displaying the size of a fish as stated in claim 8 further comprising a display of said fish weight.

11. An electronic method for measuring and displaying the size of a fish as stated in claim 8 further comprising a means for supporting said fish connected to said means for generating an electronic signal from the weight of a fish.

12. An electronic fish measuring apparatus comprising
    (a) an electronic signal generator related to the weight of a fish,
    (b) an electronic circuit to convert said electronic signal into fish length and,
    (c) a display showing said fish weight and length.

13. An electronic fish measuring apparatus as stated in claim 12 wherein the electronic signal related to fish weight is generated by devices selected from the group consisting of spring loaded potentiometers, variable capacitance sensors, strain gauges, piezo crystals, digital signal producers, or load cells measuring pressures, strains or forces caused by fish weight.

14. An electronic fish measuring apparatus as stated in claim 12 further comprising a fish support connected to said electronic signal generator.

* * * * *